United States Patent
Singh et al.

(10) Patent No.: US 12,391,822 B2
(45) Date of Patent: Aug. 19, 2025

(54) RUBBER COMPOSITION FOR TYRE TREAD

(71) Applicant: Apollo Tyres Global R&D B.V., Enschede (NL)

(72) Inventors: Vikram Singh, Enschede (NL); Louis Reuvekamp, Enschede (NL); Tharik Mohamed, Enschede (NL); Hendrik Stevens, Enschede (NL)

(73) Assignee: Apollo Tyres Global R&D B.V., Enschede (NL)

( * ) Notice: Subject to any disclaimer, the term of this patent is extended or adjusted under 35 U.S.C. 154(b) by 674 days.

(21) Appl. No.: 17/437,529

(22) PCT Filed: Mar. 13, 2020

(86) PCT No.: PCT/EP2020/056945
§ 371 (c)(1),
(2) Date: Sep. 9, 2021

(87) PCT Pub. No.: WO2020/183008
PCT Pub. Date: Sep. 17, 2020

(65) Prior Publication Data
US 2022/0153966 A1 May 19, 2022

(30) Foreign Application Priority Data

Mar. 14, 2019 (LU) ........................... 101153

(51) Int. Cl.
*C08L 9/00* (2006.01)
*B60C 1/00* (2006.01)
*B60C 11/00* (2006.01)

(52) U.S. Cl.
CPC .............. *C08L 9/00* (2013.01); *B60C 1/0016* (2013.01); *B60C 11/0008* (2013.01); *B60C 2011/0025* (2013.01); *C08L 2205/035* (2013.01); *C08L 2312/08* (2013.01)

(58) Field of Classification Search
CPC ... C08L 9/06; C08L 7/00; C08L 47/00; C08K 3/36; B60C 1/00; B60C 11/00
USPC ......................................................... 524/526
See application file for complete search history.

(56) References Cited

U.S. PATENT DOCUMENTS

| | | | |
|---|---|---|---|
| 2012/0123018 A1* | 5/2012 | Kanz ................ | C08L 21/00 523/158 |
| 2015/0148448 A1* | 5/2015 | Jung ................. | C08K 5/548 523/156 |
| 2016/0264768 A1 | 9/2016 | Francik et al. | |

FOREIGN PATENT DOCUMENTS

| | | | | |
|---|---|---|---|---|
| DE | 102014212489 A1 | 12/2015 | | |
| EP | 2412544 A1 | 2/2012 | | |
| EP | 2460848 A1 * | 6/2012 | ............... | B60C 1/00 |
| EP | 2607098 B1 | 11/2014 | | |
| EP | 2607099 B1 | 12/2014 | | |
| EP | 2889327 A2 | 7/2015 | | |
| EP | 3034328 A1 | 6/2016 | | |
| EP | 3216623 A1 | 9/2017 | | |
| EP | 3450206 A1 | 3/2019 | | |
| JP | 2016060789 A | 4/2016 | | |

OTHER PUBLICATIONS https://www.ustires.org/whats-tire-0 (Year: 2020).*
International Search Report and Written Opinion mailed Apr. 7, 2020, for corresponding priority International Patent Application No. PCT/EP2020/056945.
Search Report issued Jan. 7, 2020, for corresponding priority Luxembourg Patent Application No. LU101153.

* cited by examiner

*Primary Examiner* — Deve V Hall
(74) *Attorney, Agent, or Firm* — Renner, Otto, Boisselle & Sklar, LLP

(57) ABSTRACT

The present invention relates to a cross-linkable rubber composition, the cross-linkable rubber composition comprising, based upon parts by weight per 100 parts by weight rubber (phr): $\geq 60$ phr to $\leq 80$ phr of a butadiene rubber, a syndiotactic 1,2-polybutadiene, coupling agent, a filler, and a resin, wherein the composition co?prises $\geq 10$ phr to $\leq 20$ phr of the sy?diotactic 1,2-polybutadiene, and wherein the composition comprises $\geq 1$ phr to $\leq 20$ phr of at least two coupling agents wherein one of the coupling agents is or comprises a mercapto based silane and wherein the ratio of the mercapto based silane to the second coupling agent is in the range of $\geq 2:1$ to $\leq :10:1$.

13 Claims, No Drawings

RUBBER COMPOSITION FOR TYRE TREAD

This application is a national phase of International Application No. PCT/EP2020/056945 filed 13 Mar. 2020, which claims priority to Luxembourg Application No. LU101153 filed 14 Mar. 2019, the entire disclosures of which are hereby incorporated by reference.

The present invention relates to a cross-linkable rubber composition, a cross-linked rubber composition obtained by cross-linking such a rubber composition, a method of preparing a tyre and a tyre comprising a tyre tread.

It is well known in the tyre industry that improving wet grip typically suggests a compromise in the rolling resistance of silica-filler rubber compounds for tyre tread cap. For example, it is known that increasing the amount of silica in the rubber compound would typically improve the wet grip but compromise compound hysteresis. The same effect is observed by adding performance resins such as polyterpene, alphamethylstyrene (AMS) to the compound.

This is the reason that in the tyre industry the good rolling resistance for tyre tread caps is achieved by using silica-based rubber compounds comprising coupling agents such as bifunctional silanes or mercaptosilanes. However, these compounds do not exhibit good wet grip performance. In particular, the addition of mercaptosilane instead of traditional bifunctional silane, while having excellent hysteresis properties, negatively impacts the compound stiffness and processing, e.g. lower green strength due to decreased sheet quality. Addition of syndiotactic 1,2-butadiene is known to improve processing of compounds providing better sheeting quality and green strength.

EP2889327B1 discloses a rubber composition for use in a tire tread and a respective tread and pneumatic tire with such a tread. The rubber composition comprises a solution polymerized styrenebutadiene rubber; a polybutadiene rubber, wherein from 0 to 20 weight percent of the polybutadiene rubber is a syndiotactic polybutadiene rubber; and pre-hydrophobated silica, preferably precipitated silica, wherein the pre-hydrophobated silica is hydrophobated prior to its addition to the rubber composition by treatment with at least one silane selected from the group consisting of alkylsilanes, alkoxysilanes, organoalkoxysilyl polysulfides and organomercaptoalkoxysilanes. This rubber composition is used to enhance (increase) low strain stiffness property of the rubber composition containing the functionalized elastomer and the pre-hydrophobated silica.

EP2607098B1 relates to a tire with a tread configured with an outer cap rubber layer and an inner or internal underlying rubber layer where the underlying rubber layer comprises such syndiotactic polybutadiene-containing rubber composition. It discloses the use of a syndiotactic-1,2-polybutadiene for a rubber composition for a tire component, e.g. tread base rubber layer or apex, to promote stiffness for the rubber composition while significantly reducing its rubber reinforcing carbon black content to promote a reduction of the rubber composition's hysteresis.

EP2607099B1 relates to a pneumatic tire having a cap/base configuration comprising an outer tread cap rubber layer, with a tread running surface, and an underlying tread base rubber layer, where the base rubber layer contains syndiotactic polybutadiene with a diverse blend of carbon blacks.

DE102014212489A1 discloses a sulfur-crosslinkable rubber mixture for the sidewall of vehicle tires, which has cold flow properties, at the same time the other properties, in particular abrasion resistance and/or tear properties and/or heat buildup or the rolling resistance behavior, are not adversely affected.

JP2016060789A provides a rubber composition for bead filler and a rubber composition for run-flat supporting material each of which comprises a diene rubber component with a glass transition point of 0° C. or less, and a polymer having a syndiotactic-1,2-polybutadiene chain.

Accordingly, it is desired to improve the wet grip of silica filled tread compounds which should also exhibit good hysteresis.

Surprisingly, the inventors have found out that by using syndiotactic 1,2-polybutadiene and a specific combination of the coupling agents wherein one of the coupling agent is or comprises a mercapto silane improves wet grip of the compound while maintaining or even improving compound hysterisis. This is even more surprising as it was expected that by introduction of syndiotactic 1,2 polybutadiene in a low hysteresis compound containing mercapto silane either by replacing one or more natural or synthetic elastomers (polymers) partly or completely hysteresis would have been reduced.

Accordingly, a cross-linkable rubber composition is provided, the cross-linkable rubber composition comprising, based upon parts by weight per 100 parts by weight rubber (phr): ≥60 phr to ≤80 phr of a butadiene rubber, a syndiotactic 1,2-polybutadiene, coupling agent, a filler, and a resin, wherein the composition comprises ≥10 phr to ≤20 phr of the syndiotactic 1,2-polybutadiene, and wherein the composition comprises ≥1 phr to ≤20 phr of at least two coupling agents wherein one of the coupling agents comprises a mercapto based silane, and wherein the ratio of the mercapto based silane to the second coupling agent is in the range of ≥2:1 to ≤10:1.

In another embodiment, a cross-linkable rubber composition is provided, the cross-linkable rubber composition comprising, based upon parts by weight per 100 parts by weight rubber (phr) ≥60 phr to ≤80 phr of a butadiene rubber, a syndiotactic 1,2-polybutadiene, coupling agent, a filler, and a resin, wherein the composition comprises ≥10 phr to ≤20 phr of the syndiotactic 1,2-polybutadiene, and wherein the composition comprises ≥1 phr to ≤20 phr of at least two coupling agents wherein one of the coupling agents is a mercapto based silane, and wherein the ratio of the mercapto based silane to the second coupling agent is in the range of ≥2:1 to ≤10:1.

In the context of this invention the unit "phr" denotes "per hundred parts by weight of rubber", as it is commonly understood in the art. It is further understood that in formulations discussed in connection with the present invention the phr amount of all rubber components adds up to 100.

As used herein, a ratio of compounds such as the ratio of the mercapto based silane to the second coupling agent particularly may refer to the ratio of the respective compounds given in parts by weight per 100 parts by weight rubber (phr).

In the context of this invention a "mercapto based silane" denotes a silane coupling agent containing one or more mercapto group. Examples for mercapto based silanes are 3-mercaptopropylmethyldimethoxysilane, 3-mercaptopropyltrimethoxysilane, and 3-isocyanatopropyltriethoxysilane. A specific example for mercapto based silanes is Silaan VP Si 363 Degussa available by Evonik Industries.

It was expected that by replacing a part of the butadiene rubber with syndiotactic polybutadiene rubber will result in a compound having good wet grip and low hysteresis. Surprisingly, in combination with two different coupling agent wherein one was mercapto based silane the resulting compound had good wet grip and it even maintained the hysteresis level of the reference compound.

According to a preferred embodiment, the second coupling agent is selected from disulfide silanes, tetrasulfide silanes or a combination thereof. A specific example for a disulphide silane is TESPD available by Evonik Industries. A specific example for a tetrasulphide silane is TESPT available by Evonik Industries.

The ratio of the mercapto based silane to the second coupling agent may be in a range of $\geq 2:1$ to $\leq 5:1$, preferably $\geq 2:1$ to $\leq 4:1$.

The cross-linkable rubber composition according to the invention comprises cross-linkable groups in the rubber component(s). They may be cross-linked (cured, vulcanised) by methods known to a skilled person in the rubber technology field. The cross-linkable rubber compositions may be sulfur-vulcanizable and/or peroxide-vulcanizable. Other vulcanization systems may also be used. If desired, additives can be added. Examples of usual additives are stabilizers, antioxidants, lubricants, dyes, pigments, flame retardants, conductive fibres and reinforcing fibres.

According to a preferred embodiment, the butadiene rubber is selected from polybutadiene, functionalized polybutadiene rubber, emulsion-styrene butadiene rubber (ESBR), solution-styrene butadiene rubber (SSBR), functionalized SSBR, or a combination thereof. A functionalized elastomer (polybutadiene rubber or SSBR) is a chemically modified elastomer, whose chain ends are modified either on one end or both ends with same or different functional groups such as carboxyl groups, amine groups, hydroxyl groups; moreover chemical modification is also possible along the elastomer chain. Functionalized elastomers may have combination of chain end functionalization with functionalization along the chain. Examples of the butadiene rubber are HPR850, HPR950, HPR840, HPR940, BR740, BR511 from JSR Corporation; SLR4602, SLR6402, SLR3402 from Styron; F3430, N211, S202, L251 from Asahi Kasei.

According to a preferred embodiment, the butadiene rubber is present in an amount ranging from $\geq 60$ to $\leq 80$ phr, and preferably $\geq 70$ to $\leq 80$ phr.

According to a preferred embodiment, the composition further comprises $\geq 10$ phr to $\leq 20$ phr of a natural rubber. The natural rubber may be a sheet processed natural rubber such as a Ribbed Smoked Sheets (RSS) rubber or may be a Technically Specified Rubber (TSR). There exist different grades of Ribbed Smoked Sheets rubber, usually grades RSS-2, RSS-3 and RSS-4 are used for tyre treads. TSR grades such as TSR10, TSR20 are also used in tyre tread compounds.

According to a preferred embodiment, the filler is selected from carbon blacks, silica, surface treated silica, surface treated carbon blacks or a combination thereof. Examples for carbon blacks are N134, N220, N330, N339, N379, also 2109, 2115, 2123, 2125 from Birla carbon. Examples for silica are Zeosil-1085MP, 1115MP, 1165MP, HRS 1200MP; Premium 200MP from Rhodia; Ultrasil-5000GR, 7000GR, 9100GR from Evonik Industries; Hi-sil-EZ120G(G-D), EZ160G (G-D), 190G (G-D), EZ200G (G-D), 210, 255CG-D, 315G (G-D) from PPG Industries. Examples for surface treated silica are Agilon 400, Agilon 454, Agilon 458 from PPG Industries. Examples for surface treated carbon blacks are 2125XZ from Brila Carbon.

According to a preferred embodiment, the resin is selected from polyterpene (PT) resins, terpene phenolic (TP) resins, alpha methyl styrene (AMS) resins or a combination thereof.

The polyterpene resins can be selected from—Sylvatratrxx 4125, AMS resins can be selected from—Sylvatraxx 4401; Sylvares SA85, Sylvares SA140 from Kraton; polyterpene resins can be selected from—Decolyte LTG Dercolyte A115, Dercolyte A125, Dercolyte S115, Dercolyte S125; the terpene phenolic resins can be selected from—Sylvatraxx 4202, Dertophene T, Dertophene T105, Dertophene T115, Dertophene H150, from DRT and others According to a preferred embodiment, the resin is present in an amount ranging from $\geq 1$ to $\leq 30$ phr.

Another aspect of the present invention is a cross-linked rubber composition that is obtained by cross-linking a rubber composition according to the invention.

In an embodiment, the cross-linked rubber composition has a G' at 0° C. (measured by DMA as per ISO 4664-1) ranging from 22 to 38 Mpa. In an embodiment, the cross-linked rubber composition has a rebound value at 23° C. (as per ISO 4662) ranging from $\geq 8\%$ to $\leq 15\%$. In an embodiment, the cross-linked rubber composition has a G' at 0° C. (measured by DMA as per ISO 4664-1) ranging from 22 to 38 Mpa and has a rebound value at 23° C. (as per ISO 4662) ranging from $\geq 8\%$ to $\leq 15\%$.

The present invention also relates to a method of preparing a tyre, comprising the steps of:
  providing a tyre assembly comprising a cross-linkable rubber composition according to the invention; and
  cross-linking at least the cross-linkable rubber composition according to the invention in the tyre assembly.

The present invention also encompasses a tyre comprising a tread, wherein the tread comprises a cross-linked rubber composition according to the invention. Such cross-linked rubber compositions are particularly usable for manufacturing tread cap compounds or secondary tread compounds such as tread like base or second cap compound.

A further aspect of the invention relates to the use of the cross-linked rubber composition according to the present invention for increasing the wet grip of a tyre.

A further aspect of the invention relates to the use of the syndiotactic 1,2-polybutadiene and at least two coupling agents wherein one of the coupling agents comprises a mercapto based silane for increasing the wet grip of the tyre.

In another embodiment the use of the syndiotactic 1,2-polybutadiene and at least two coupling agents wherein one of the coupling agents is a mercapto based silane for increasing the wet grip of the tyre is disclosed. The ratio of the mercapto based silane to the second coupling agent may be in the range of $\geq 2:1$ to $\leq 10:1$.

The invention will be further described with reference to the following examples without wishing to be limited by them.

Methods:

Hardness Test: A hardness test was performed on a Zwick 3150 Shore A Hardness Tester according to DIN-53505 at 23° C. The hardness (in Shore A) for a test specimen was measured by making 5 determinations at different positions using a Durometer type A as described in the Hardness Shore A manual from Zwick. The determinations were at least 6.0 mm apart and at least 12 mm from any edge.

Tensile strength: Tensile strength analysis was performed for cured samples by Zwick Z005 apparatus with a speed of 500 mm/min speed. Samples were cured at 160° C. for 20 minutes and standard tensile specimens were cut from rubber sheet according to ISO 37 standard. Measuring force elongation properties via tensile method also determines modulus at various elongations i.e. 25%, 100%, 200% & 300%; which indicates (or correlates to) static stiffness and ultimate elongation at break.

Rebound: Rebound measurements were performed for cured samples on a Bareiss digi test II Rebound Resilience Tester at a temperature of 23° C. Samples were cured at 170° C. for 12 minutes as round shape of 28 mm diameter and 12 mm thickness.

Dynamic mechanical properties by DMA: Dynamic mechanical analysis (DMA) analysis of rubber compounds was performed for cured samples by Metravib DMA+450 in double shear mode. Samples were cured at 170° C. for 10 minutes shaped as cylinders of 8 mm diameter and 2 mm thickness. DMA was performed by temperature sweep at constant frequency 10 Hz with 6% strain in a temperature range of 25° C. to 80° C.

Storage modulus (G') was measured by using the DMA which is indicator of stiffness under dynamic conditions.

General procedure for preparing cross-linked rubber compositions: cross-linkable rubber compositions were prepared as described in the examples 1 and 2 and cross-linked. Materials mentioned in the tables were:

The NR rubber used was TSR20.

The butadiene rubber was HPR850 supplied by JSR Corporation.

The syndiotactic 1,2-polybutadiene was AT 400 syndiotactic 1,2-butadiene supplied by JSR Corporation.

The coupling agent 1 was Silaan VP Si 363 Degussa supplied by Evonik Industries

The coupling agent 2 was TESPD (disulphide silane) supplied by Evonik Industries The filler was silica supplied by PPG Industries The resin was terpene phenolic resin supplied by Kraton Corporation In accordance with the preceding, cross-linkable rubber compositions were prepared from compounds as described in the tables below. In a first step, all rubber components were added and mixed, followed by a second step wherein all additives were added and mixed and a last step wherein the curing package was added.

EXAMPLE 1

The table below shows the composition I1 in comparison to a reference composition R1 wherein the Nd-Butadiene rubber was replaced with a syndiotactic 1,2-butadiene rubber and the compositions had a high loading of silica.

| Components | Reference R1 (PHR) | I1 amount (PHR) |
| --- | --- | --- |
| NR | 15.00 | 15.00 |
| Nd-BR | 15.00 | 0.00 |
| Syndiotactic 1,2-butadiene | 0.00 | 15.00 |
| BR | 70.00 | 70.00 |
| Filler | 80.00 | 80.00 |
| Coupling Agent 1 | 8.00 | 8.00 |
| Coupling agent 2 | 2.00 | 2.00 |
| Resin | 15.00 | 15.00 |

The following table shows the results obtained from the cured compositions of table 1:

| Result | | R1 | I1 |
| --- | --- | --- | --- |
| Hardness (median) | ° Sh A | 67.00 | 77.70 |
| M25% | MPa | 1.49 | 2.45 |
| M100% | MPa | 5.76 | 7.64 |
| Rebound (23° C.) | % | 18.00 | 11.50 |
| G' (0° C.) | MPa | 11.50 | 36.48 |
| Tan (70° C.) | | .08 | .08 |

The results show a reduction in rebound at 23 degrees from 18.00 to 11.50 and increase in G' at 0° C. from 11.50 to 36.50. The reduction in rebound and increase in G' are well known indicators of increase in the wet grip in the tyre industry.

Improvement was also observed in compound consistency during dump after mixing in Banbury mixer in the form of lumps and not in crumb or small pieces of compound. For sheeting at the mill no bagging at the mill nip and no holes in band were formed on mill roller with good sheet surface.

Increase in the stiffness of the cured rubber was also observed by measuring modulus M25% and M100% (static stiffness) and DMA G' (0° C.) and G' (70° C.) (dynamic stiffness). Further, the replacement of Nd-Butadiene rubber with a syndiotactic 1,2-butadiene rubber resulted in an increase in hardness.

The hysteresis of compound was measured using DMA and values of tan δ @70° C. indicates that the hysteresis is maintained after addition of syndiotactic 1,2-butadiene polymer.

EXAMPLE 2

The table below shows the composition I2 in comparison to a reference composition R2 wherein the Nd-Butadiene rubber was replaced with a syndiotactic 1,2-butadiene rubber and the amount of silica had been reduced in both the compositions.

| Components | Reference R2 (PHR) | I2 amount (PHR) |
| --- | --- | --- |
| NR | 15.00 | 15.00 |
| Nd-BR | 15.00 | 0.00 |
| Syndiotactic 1,2-butadiene | 0.00 | 15.00 |
| BR | 70.00 | 70.00 |
| Filler | 55.00 | 55.00 |
| Coupling Agent 1 | 5.50 | 5.50 |
| Coupling agent 2 | 2.00 | 2.00 |
| Resin | 15.00 | 15.00 |

The following table shows the results obtained from the cured compositions of the table 3:

| Result | | R2 | I2 |
| --- | --- | --- | --- |
| Hardness (median) | ° Sh A | 60.40 | 70.60 |
| M25% | MPa | 0.99 | 1.83 |
| M100% | MPa | 3.43 | 6.04 |
| Rebound (23° C.) | % | 22.90 | 11.60 |
| G' (0° C.) | MPa | 5.61 | 23.68 |
| Tan (70° C.) | | .06 | .06 |

As can be seen from this table, results were better for the rubber composition when Nd-Butadiene rubber was replaced with a syndiotactic 1,2-butadiene rubber.

Such cross-linked rubber compositions are particularly usable for manufacturing a tyre tread compounds. These compositions can further be used to manufacture tread cap compounds or secondary tread compounds.

The invention claimed is:

1. A cross-linkable rubber composition, the cross-linkable rubber composition comprising, based upon parts by weight per 100 parts by weight rubber (phr):
≥70 phr to ≤80 phr of a butadiene rubber and ≥10 phr to ≤20 phr of a natural rubber,
a syndiotactic 1,2-polybutadiene,
coupling agent,
a filler, and
a resin,
wherein the composition comprises ≥10 phr to ≤20 phr of the syndiotactic 1,2-polybutadiene, and wherein the composition comprises ≥1 phr to ≤20 phr of at least two coupling agents wherein one of the coupling agents is or comprises a mercapto based silane and wherein the ratio of the mercapto based silane to the second coupling agent is in the range of ≥2:1 to ≤10:1.

2. The rubber composition according to claim 1, wherein the second coupling agent is selected from disulfide silanes, tetrasulfide silanes or a combination thereof.

3. The rubber composition according to claim 1, wherein the butadiene rubber is selected from polybutadiene, functionalized polybutadiene rubber, ESBR, SSBR, functionalized SSBR, or a combination thereof.

4. The rubber composition according to claim 1, wherein the filler is selected from carbon blacks, silica, surface treated silica, surface treated carbon blacks or a combination thereof.

5. The rubber composition according to claim 1, wherein the resin is selected from polyterpene resins, terpene phenolic resins, alpha methyl styrene resins or a combination thereof.

6. The rubber composition according to claim 1, wherein the resin is present in an amount ranging from ≥1 to ≤30 phr.

7. A cross-linked rubber composition, wherein it is obtained by cross-linking a rubber composition according to claim 1.

8. The cross-linked rubber composition according to claim 7 with a G' at 0° C. (measured by DMA as per ISO 4664-1) ranging from 22 to 38 MPa.

9. The cross-linked rubber composition according to claim 7 with a rebound value at 23° C. (as per ISO 4662) ranging from ≥8% to ≤15%.

10. A method of preparing a tyre, comprising the steps of:
providing a tyre assembly comprising a cross-linkable rubber composition according to claim 1; and
cross-linking at least the cross-linkable rubber composition in the tyre assembly.

11. A tyre comprising a tread, wherein the tread comprises a cross-linked rubber composition according to claim 7.

12. A process of using the cross-linked rubber composition for increasing the wet grip of a tyre comprising:
providing a tyre;
including the cross-linked rubber according to claim 7 in the tyre.

13. A process of using a syndiotactic 1,2-polybutadiene and at least two coupling agents for increasing the wet grip of a tyre comprising:
providing a tyre;
including a syndiotactic 1,2-polybutadiene and at least two coupling agents in the tyre;
wherein one of the coupling agents is or comprises a mercapto based silane.

* * * * *